US010768643B2

(12) United States Patent
Von Der Assen et al.

(10) Patent No.: US 10,768,643 B2
(45) Date of Patent: Sep. 8, 2020

(54) PRESSURE REDUCER FOR ANIMAL DRINKING TROUGHS, AND METHOD FOR ADJUSTING AT LEAST ONE PRESSURE REDUCER FOR ANIMAL DRINKING TROUGHS

(71) Applicant: Lubing Maschinenfabrik Ludwig Bening GmbH & Co. KG, Barnstorf (DE)

(72) Inventors: Markus Von Der Assen, Steinfeld (DE); Wolfgang Meyer, Barnstorf (DE); Michael Abeln, Halen (DE)

(73) Assignee: Lubing Maschinenfabrik Ludwig Bening GmbH & Co. KG, Barnstorf (DE)

( * ) Notice: Subject to any disclaimer, the term of this patent is extended or adjusted under 35 U.S.C. 154(b) by 0 days.

(21) Appl. No.: 16/318,190

(22) PCT Filed: Jul. 12, 2017

(86) PCT No.: PCT/EP2017/000825
§ 371 (c)(1),
(2) Date: Jan. 16, 2019

(87) PCT Pub. No.: WO2018/015002
PCT Pub. Date: Jan. 25, 2018

(65) Prior Publication Data
US 2019/0227580 A1 Jul. 25, 2019

(30) Foreign Application Priority Data

Jul. 20, 2016 (DE) .................... 10 2016 008 661
Mar. 2, 2017 (DE) .................... 10 2017 002 034

(51) Int. Cl.
*G05D 16/20* (2006.01)
*A01K 7/02* (2006.01)

(52) U.S. Cl.
CPC ......... *G05D 16/2026* (2013.01); *A01K 7/025* (2013.01); *G05D 16/2053* (2013.01);
(Continued)

(58) Field of Classification Search
CPC ......... Y10T 137/7796; Y10T 137/7798; Y10T 137/783; Y10T 137/7831; G05D 16/2026;
(Continued)

(56) References Cited

U.S. PATENT DOCUMENTS 1,967,981 A * 7/1934 Thomas ................ F16K 31/365
137/496
2,977,966 A * 4/1961 Matthews .......... G05D 23/1925
137/66
(Continued)

FOREIGN PATENT DOCUMENTS

DE        3839146 A1    5/1990
DE    102008061994 A1    5/2010
(Continued)

OTHER PUBLICATIONS

Deutsches Patent—Und Markenamt (German Patent and Trademark Office), Recherchenbericht (serach in a related application), Jan. 19, 2018.
(Continued)

*Primary Examiner* — William M McCalister
(74) *Attorney, Agent, or Firm* — Laurence P. Colton; Smith Tempel Blaha LLC

(57) ABSTRACT

Animal drinking troughs have pressure reducers for reducing the higher pressure of the liquid supply to a low liquid pressure for supplying the animal drinking troughs. For various reasons, it is desired to change the reduced pressure. This takes place by adjustment of the pressure reducers. It is known to undertake such an adjustment with compressed air. This requires a separate compressed air source and a corre-
(Continued)

sponding pipe system. The invention makes provision to adjust the pressure reducer hydraulically by means of the higher pressure of the liquid of the liquid supply. The energy required for adjusting the pressure reducers thereby provides the liquid pressure of the liquid supply. As a result, the pressure reducers according to the invention operate autonomously. A separate energy source for adjusting the pressure reducers is not required.

15 Claims, 2 Drawing Sheets

(52) U.S. Cl.
CPC ..... *G05D 16/2086* (2013.01); *G05D 16/2093* (2013.01); *Y10T 137/7798* (2015.04)

(58) Field of Classification Search
CPC ........... G05D 16/2053; G05D 16/2086; G05D 16/2093; A01K 7/0125
USPC ............. 137/505.13, 505.15, 505.46, 505.47
See application file for complete search history.

(56) References Cited

U.S. PATENT DOCUMENTS

| | | | | |
|---|---|---|---|---|
| 3,567,289 A * | 3/1971 | Tsuneo | ................. | B60T 8/26 303/9.73 |
| 4,944,249 A * | 7/1990 | Takeuchi | ................. | A01J 5/048 119/14.44 |
| 6,019,121 A * | 2/2000 | Uehara | ................. | G05D 16/0672 137/116.5 |
| 7,604,019 B2 * | 10/2009 | Frampton | ................. | A62B 7/14 137/81.1 |
| 8,381,761 B2 * | 2/2013 | Re | ................. | F16K 31/1268 137/489.5 |
| 8,534,315 B2 * | 9/2013 | Mason | ................. | G05D 16/0672 137/315.05 |
| 8,800,593 B2 * | 8/2014 | Sakasegawa | ................. | G01F 5/00 137/487.5 |
| 8,910,657 B2 * | 12/2014 | Stoever | ................. | G05D 16/2097 137/505.14 |
| 9,086,701 B2 * | 7/2015 | Okitsu | ................. | G05D 16/163 |
| 10,409,298 B2 * | 9/2019 | Ponzo | ................. | G05D 16/2013 |
| 2002/0036013 A1 * | 3/2002 | Inayama | ................. | G05D 16/2024 137/487.5 |
| 2003/0070710 A1 * | 4/2003 | Inayama | ................. | G05D 16/2095 137/85 |

FOREIGN PATENT DOCUMENTS

| | | |
|---|---|---|
| EP | 0277525 A2 | 8/1988 |
| EP | 1097635 B1 | 4/2005 |
| EP | 2085852 A2 | 8/2009 |
| WO | 2005095211 A1 | 10/2005 |

OTHER PUBLICATIONS

WIPO, International Search Report (in the parent application), dated Oct. 6, 2017.

* cited by examiner

PRESSURE REDUCER FOR ANIMAL DRINKING TROUGHS, AND METHOD FOR ADJUSTING AT LEAST ONE PRESSURE REDUCER FOR ANIMAL DRINKING TROUGHS

CROSS REFERENCE TO RELATED APPLICATIONS

This application is the US National Phase of and claims the benefit of and priority on International Application No. PCT/EP2017/000825 having a filing date of 12 Jul. 2017, which claims priority on and the benefit of German Patent Application No. 10 2016 008 661.0 having a filing date of 20 Jul. 2016 and German Patent Application No. 10 2017 002 034.5 having a filing date of 2 Mar. 2017.

BACKGROUND OF THE INVENTION

Technical Field

The invention relates to a pressure reducer for animal drinking troughs, comprising a housing in which a membrane is provided, said membrane dividing the housing into a liquid chamber for liquid for supplying the animal drinking troughs and a chamber with an adjustable regulating device acting on the membrane and with a regulating valve which is actuatable by the membrane and is assigned to an inlet, opening in the liquid chamber, for liquid from a liquid supply. Furthermore, the invention relates to methods for adjusting at least one pressure reducer for animal drinking troughs, wherein an adjustable regulating device of the respective pressure reducer can be used to reduce the pressure of the liquid of a liquid supply that is supplied to the respective pressure reducer.

Prior Art

Animal drinking troughs are customarily operated at a liquid pressure which is lower than the pipe pressure of a liquid supply. Pressure reducers serve to reduce the higher pipe pressure of the water supply to a lower pressure which is suitable for supplying the animal drinking troughs. Customarily, a plurality of drinking trough lines with a multiplicity of animal drinking troughs, in particular drinking trough valves, are provided, at least in relatively large sheds, wherein each drinking trough line is generally assigned a pressure reducer. Relatively large sheds thus have a plurality of preferably identical pressure reducers.

The drinking trough lines with the drinking trough places are rinsed at the full pipe pressure of the liquid supply. For this purpose, the pressure reducers have to be adjustable in such a manner that they do not reduce the pipe pressure of the liquid supply for rinsing. However, even in the drinking trough mode, the pressure reducers have to be adjustable for various reasons.

Pressure reducers which are adjusted manually are known. This is highly complicated because the shed has to be entered for this purpose. This complexity is increased even further if a plurality of pressure reducers are present in relatively large sheds. In addition, it is difficult to manually adjust the respective pressure reducer precisely to the desired reduced liquid pressure at the drinking trough places. In order to eliminate these disadvantages, it is also already known to adjust pressure reducers pneumatically. This requires a supply of compressed air and a network with compressed air lines, which is complicated in the case of relatively large sheds with a multiplicity of pressure reducers.

BRIEF SUMMARY OF THE INVENTION

The invention is based on the object of providing a pressure reducer for animal drinking troughs and a method for adjusting at least one pressure reducer for animal drinking troughs, which pressure reducer and method permit simple operation and require only a low outlay on apparatus.

A pressure reducer for achieving this object is a pressure reducer for animal drinking troughs, comprising a housing in which a membrane is provided, said membrane dividing the housing into a liquid chamber for liquid for supplying the animal drinking troughs and a chamber with an adjustable regulating device acting on the membrane and with a regulating valve which is actuatable by the membrane and is assigned to an inlet, opening in the liquid chamber, for liquid from a liquid supply, characterized in that the regulating device is actuatable and/or adjustable with the liquid of the liquid supply. In the case of this pressure reducer, it is provided that its regulating device is actuatable and/or adjustable with the liquid of the liquid supply. The energy of the pressure of the liquid of the liquid supply is therefore used in order to actuate or to adjust the regulating device of the pressure reducer. An automatic change in the pressure of the liquid supply of the animal drinking troughs can thereby take place without an additional energy supply, in particular without compressed air.

The regulating device is preferably assigned at least one inlet channel for liquid, which is not yet reduced in pressure, of the liquid supply, in particular of a feed water pipe, and at least one outflow channel for liquid from the regulating device. The inlet channel and the outflow channel lead firstly to the regulating device and secondly away therefrom. In addition, the inlet channel and the outflow channel are connected to each other. They thereby communicate with each other. The liquid from the liquid supply, in particular liquid which is not yet reduced in pressure, can be supplied to the regulating device through the inlet channel. The pressure of said liquid can thereby be used for setting or adjusting the regulating device.

It is furthermore preferably provided for the inlet channel and the outflow channel to each be assigned a valve. The respective valve is preferably a controllable valve, for example an electrically controllable solenoid valve.

The valves in the inlet channel and outflow channel make it possible in a specific manner to control and/or to regulate the liquid flowing to the regulating device and also the liquid flowing out from the regulating device. As a result, the pressure reduction rate of the pressure reducer can be adjusted or set by the regulating device in the desired manner in accordance with the requirements and the pressure reducer can optionally also be temporarily set, for rinsing the respective animal drinking trough, in such a manner that no pressure reduction takes place.

An advantageous possibility of developing the pressure reducer provides at least one means for measuring a force and/or a mechanical pressure (force-measuring means) between the regulating device and a membrane which is influenced by the latter. The force by which the regulating device acts on the membrane, in particular presses against the membrane, can be determined, preferably continuously, by the force-measuring means. This force is proportional to the pressure of the liquid for the animal drinking troughs, said pressure being changed in pressure, in particular reduced. This leads to the regulating device being able to be adjusted or set in a targeted manner by the liquid pressure in such a manner that the force measured by the at least one force-measuring means corresponds to an intended force which is proportional to the desired reduced pressure of the liquid for the animal drinking troughs that is to be produced by the pressure reducer.

A controller and/or regulator is preferably provided, into which the desired intended pressure of the liquid to be supplied to the animal drinking troughs can be input. Measured values detected by the force-measuring means can be supplied to the controller and/or regulator and, by a comparison of the measured values with the intended value, the at least one valve in the inlet channel and the at least one valve in the outflow channel of the regulating device can be correspondingly controlled and/or regulated. As a result, the regulating device, actuated by the liquid pressure, which can be set or can be regulated by the valves, can be adjusted in such a manner that the desired intended pressure of the liquid to be supplied to the drinking trough valves is reached.

An advantageous possibility of configuring the pressure reducer makes provision for the regulating device to have at least one hydraulically prestressable spring member. The spring member can be, for example, at least one compression spring. The spring member acts on the membrane from that side of the housing to which the regulating device is assigned. The at least one spring member preferably presses against that side of the membrane which is directed away from the liquid chamber. By means of the regulating device, the prestressing of the spring member can be changed to meet requirements and the membrane can thereby be correspondingly prestressed, as a result of which a regulating valve, which opens into the liquid chamber, is actuated by the membrane with a force of greater or lesser size in order to reduce the liquid pressure.

Preferably, an end of the spring member that is directed away from the membrane is assigned a piston. A cylinder which is connected in particular to the housing corresponds with said piston. By shifting the piston in the cylinder, the spring member is prestressed and/or compressed to a greater or lesser extent. As a result, a hydraulic change in the prestressing of the spring member of the regulating device can take place. Liquid which can be supplied to the cylinder through the inlet channel, i.e. the pressure, which is not yet reduced by the pressure reducer, of the liquid supply serves here as the hydraulic fluid. The inlet channel opens in the cylinder where it can build up a pressure which leads to the desired displacement of the piston in the cylinder and thereby more greatly prestresses the spring member of the regulating device. If the prestressing of the spring member is intended to be reduced, liquid is conducted out of the cylinder via the outflow channel. Said liquid which is removed from the cylinder passes via the outflow channel preferably into the liquid chamber on the rear side or lower side of the membrane that is directed away from the cylinder with the piston and also from the spring member.

A method for achieving the object mentioned at the beginning is a method for adjusting pressure reducers for animal drinking troughs, wherein an adjustable regulating device of the respective pressure reducer can be used to reduce the pressure of the liquid of a liquid supply that is supplied to the respective pressure reducer, characterized in that the pressure of the liquid of the liquid supply is used for adjusting the regulating device. In this method, it is provided to use liquid, specifically preferably a liquid at a higher and not yet reduced pressure of a liquid supply, for adjusting one or more pressure reducers. A regulating device of the respective pressure reducer is hydraulically actuated with said liquid, and in particular is changed in the setting. The energy of the liquid of the liquid supply, in particular the energy contained in the pressure of the liquid, can thereby be used in order to change the pressure reduction rate of the at least one pressure reducer. Therefore, according to the method according to the invention, no external energy or no additional energy or extra energy is required in order to adjust the at least one pressure reducer.

A further method for achieving the object mentioned at the beginning, wherein this can also be a preferred development of the previously described method, makes provision to change the setting of the regulating device according to a time-dependent, for example daytime-dependent, profile. It is thereby possible to feed the animal drinking troughs at a greater liquid pressure at times at which the animals have a greater need for liquid, for example in the morning, such that the animals can extract greater quantities of liquid per unit of time from the animal drinking troughs, in particular from the drinking trough valves thereof. The time-dependent profile or liquid pressure profile can be individually produced by definition of time periods and the reduced intended pressure, which is assigned to said profile, for supplying the animal drinking troughs. It is also conceivable to define a time-dependent profile which extends over weeks or months. It is thus possible, for example, at at least one pressure reducer to set a pressure for supplying the animal drinking troughs, said pressure increasing with the age of the animals in order thus automatically to sufficiently satisfy the increased requirement for liquid of older animals.

A further method for achieving the object mentioned at the beginning, which can also be a development of one or both previously described methods, makes provision to individually adjust the regulating devices of all of the selected or individual pressure reducers. If, for example, a plurality of groups of animals are accommodated in a shed, the animal drinking troughs of the individual groups can be supplied with a different liquid pressure. An individual adaptation to the requirement for liquid of the animals in the respective group is thereby possible.

BRIEF DESCRIPTION OF THE DRAWINGS

A preferred exemplary embodiment of the invention will be explained in more detail below with reference to the drawing, in which.

DETAILED DESCRIPTION OF PREFERRED EMBODIMENTS

Figure 1:
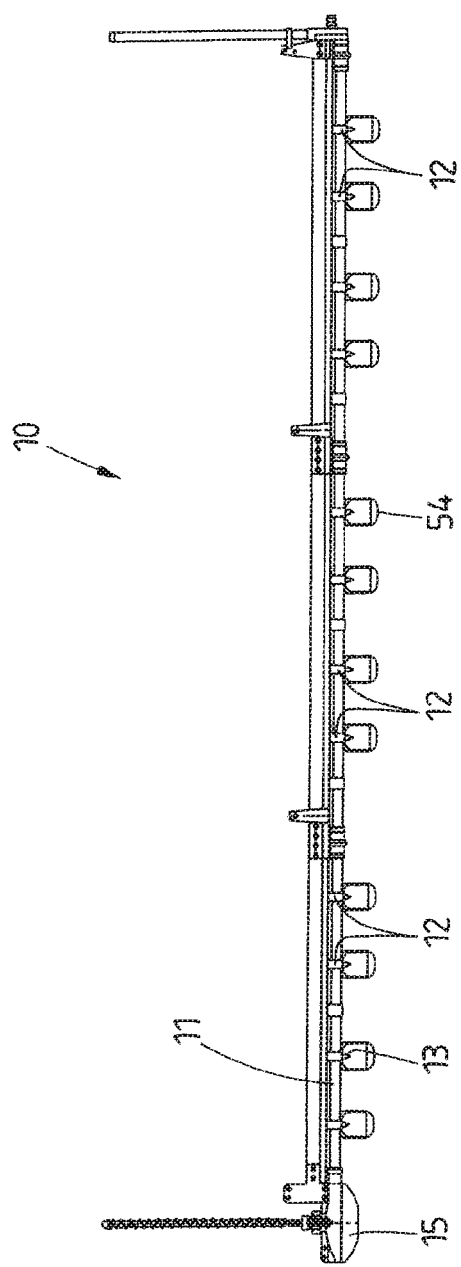
FIG. 1 shows a schematic side view of an animal drinking trough.

FIG. 1 illustrates an animal drinking trough in the form of a line drinking trough 10. The animal drinking trough 10 makes it possible for animals, in particular small animals, such as poultry, to automatically satisfy their requirement for water.

The line drinking through 10 is suspended, for example, on cables (not shown in the figures) in the shed, specifically at a distance from the shed floor that corresponds to the height of the animals, and therefore the animals can comfortably reach the line drinking trough 10.

The line drinking trough 10 has a drinking trough line with an elongate, rectilinear liquid-conducting pipe 11. The liquid-conducting pipe 11 can be designed in one line, but also in a plurality of lines, in the form of a liquid-circulating pipe. The liquid-conducting pipe 11 can be fed with liquid from a liquid supply. The liquid can be pure water, in particular tap water, but also treated water. For example, the water can be provided with nutrients and/or drugs.

The liquid-conducting pipe 11 of the drinking trough line shown is provided with a plurality of drinking trough valves 12 which are arranged at a distance from one another and are preferably identical to one another. The drinking trough valves 12 can be screwed, for example, into the liquid-conducting pipe 11 from below, specifically in such a manner that they partially protrude at the bottom out of the liquid-conducting pipe 11. The drinking trough valves 12 which are known per se have at least one valve pin and an actuating pin 13 arranged therebelow. A lower actuating region of the actuating pin 13 protrudes downward from a housing 14 of the drinking trough valve 12. Said lower, free actuating portion of the actuating pin 13 is accessible for the animals, in particular for their beaks. The animals can tilt or raise the actuating pin 13 with the lower actuating end in order to open the respective drinking trough valve 12. After the actuating pin 13 is released, the latter returns again into its initial position, as a result of which the drinking trough valve closes automatically and independently.

In the case of the line drinking trough 10 shown, drip cups 54 are assigned to the drinking trough valves 12. Said drip cups do not necessarily need to be provided.

Customarily, a plurality of line drinking troughs 10 of identical length or else of differing length are arranged in a shed. In the case of relatively large sheds which are divided into a plurality of compartments for one group of animals in each case, at least one line drinking trough 10 is located in each compartment of the shed.

The line drinking trough 10 is provided with a pressure reducer 15. In the case of the illustration according to FIG. 1, the pressure reducer 15 is assigned to the left end of the liquid line 11, specifically is either attached thereto and/or connected thereto.

Figure 2:
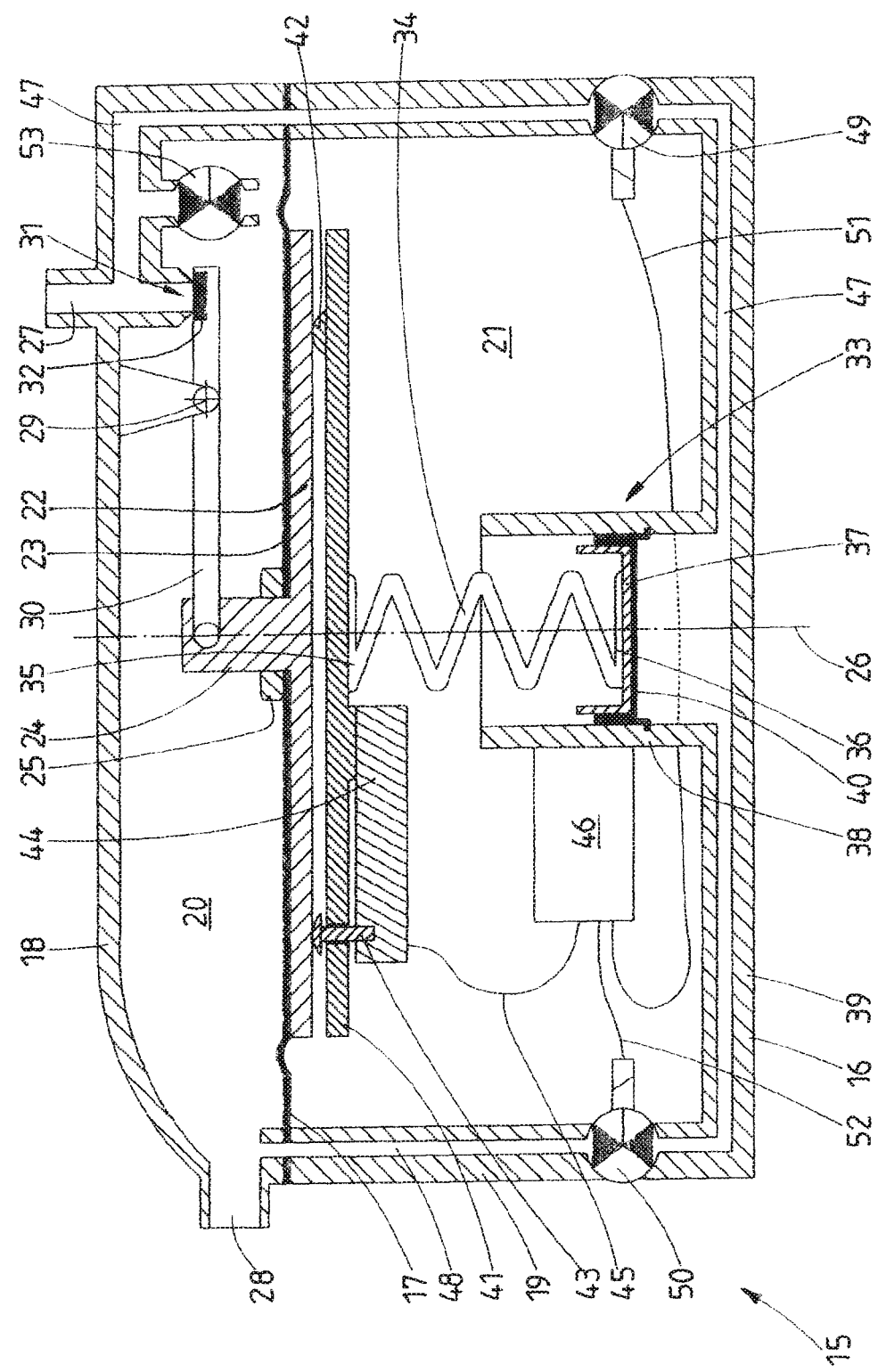
FIG. 2 shows a schematic central section through a pressure reducer of the animal drinking trough of FIG. 1.

The pressure reducer 15 which is illustrated in section and in detail in FIG. 2 is designed in a particular manner according to the invention, namely is variable in respect of its pressure reduction rate. For the description below, the ratio between the greater liquid pressure of the liquid supply to the lower liquid pressure which is reduced by the pressure reducer 15 denotes the pressure reduction rate.

The pressure reducer 15 has a closed housing 16 composed preferably of plastic. The housing 16 is preferably of multi-part design, for example is composed of two housing parts which are preferably connected to each other in a liquid-tight manner. The interior of the housing 16 of the pressure reducer 15 is divided by an elastic membrane 17. For example, the membrane 17 can be located between the two housing parts, specifically between a housing upper part 18 and a housing lower part 19. When the housing upper part 18 is connected, preferably screwed, to the housing lower part 19, the membrane 17 is fixed between the two, for example by clamping. An outer circumference of the membrane 17 can serve here at the same time as a seal between the housing upper part 18 and the housing lower part 19. The housing lower part 19 has at least one small ventilation or venting opening (not illustrated in the figures) for avoiding a buildup of pressure in the housing lower part 19. At the same time, the at least one small opening or bore can serve for conducting away condensation water, which forms under the membrane 17, out of the housing lower part 19.

The membrane 17 divides the housing 16 of the pressure reducer 15 into two chambers which are separated in a liquid-tight manner from each other, specifically a liquid chamber 20, located on one side of the membrane 17, preferably above same, in the housing upper part 18 and a chamber 21, located on the opposite side of the membrane 17, in the housing lower part 19.

The membrane 17 is connected to a supporting body 22. The supporting body 22 has a thin, flat and stable supporting surface 23 and a stud 24 which is integrally formed thereon and protrudes upward. The supporting body 22 is preferably formed integrally from plastic. The supporting surface 23 is assigned to that side of the membrane 17 which bounds the chamber 21, i.e. to the lower side of same in the exemplary embodiment illustrated. The stud 24 of the supporting body 22 is guided through a central recess of the membrane 17 such that said stud protrudes into the liquid chamber 20. By means, for example, of a union nut 25 which can be screwed onto the stud 24, the supporting body 22 is connected to the membrane 17 and the recess in the membrane 17 is sealed off from the stud 24.

In the case of the housing 14 with a round area, the membrane 17 is also round, i.e. circular, specifically like the supporting surface 23 and the stud 24 of the supporting body 22. The outer diameter of the supporting surface 23 is smaller than the inner diameter of the housing 16, and therefore an outer circular area of the membrane 17 is exposed between the housing upper part 18 and the housing lower part 19. In the region of said circular area, the membrane 17 is deformable in elastically springing-back manner, as a result of which the supporting body 22 with the inner part of the membrane 17 located therebelow is movable to and fro on a longitudinal center axis 26 of the housing 16, in particular is movable up and down in the position of the line drinking trough 10 that is shown in FIGS. 1 and 2.

The housing lower part 18 of the pressure reducer 15 has an inlet 27 for liquid, which is to be reduced in pressure, from the liquid supply, and an outlet 28 for the liquid reduced in pressure or liquid which is not pressure-reduced in the case of rinsing. The inlet 27 opens in the liquid chamber 20 which, in the exemplary embodiment shown, is located above the membrane 17. The outlet 28 emerges from the liquid chamber 20.

A double-armed lever 30 which is mounted tiltably about a fixed axis of rotation 29 in the liquid chamber 20 of the housing upper part 18 is connected at one end in an articulated manner to the stud 24 of the supporting body 22 of the membrane 17 and is assigned at the other, opposite end to a free, lower opening 31 of the inlet 27. At the point where the end of the double-armed lever 30 that is assigned to the inlet 27 can be brought into contact with the opening 31, the double-armed lever 30 is connected to a seal 32. If said seal 32 lies in a sealing manner against the opening 31 by corresponding pivoting of the double-armed lever 30 counterclockwise, said seal closes the inlet 27. This is the case when the membrane 17 is pressed downward by the liquid pressure prevailing in the interior of the liquid chamber 20 and the double-armed lever 30 is thereby charged with a force counterclockwise and thus tilted. If, by contrast, the membrane 17 is moved upward, the seal 32 lifts off from the opening 31 of the inlet 27 and opens up said opening. The inlet 27 and the seal 32, which is assigned to its upper opening 31, of the double-armed lever 30 thereby constitute a regulating valve with which the higher liquid pressure is reduced to a lower liquid pressure in accordance with the pressure reduction rate which is set. Said lower liquid pressure which is reduced by the pressure reducer 15 prevails throughout the liquid chamber 20 in the housing upper part 18, as a result of which liquid leaves the outlet 28 at a lower or reduced pressure. Said liquid passes into the liquid-conducting pipe 11 of the line drinking trough 10, as a result of which the drinking trough valves 12 are subjected to the lower liquid pressure which is reduced by the pressure reducer 15.

In order to change the pressure reduction rate of the pressure reducer 15, the membrane 17 is assigned a regulating device 33. The regulating device 33 is located in the chamber 21 of the housing lower part 19 of the pressure reducer 15. In said lower chamber 21 which is separated in a liquid-tight manner from the upper liquid chamber 20 by the membrane 17, there is no liquid, but rather essentially only air.

The regulating device 33 has a spring member which, in the exemplary embodiment of FIG. 2, is in the form of a compression spring 34. The compression spring 34 is supported at a preferably upper end 35 under the membrane 17. At an opposite, lower end 36, the compression spring 34 is assigned to a cylinder-piston unit. A movable piston 37 of the piston-cylinder unit is assigned to the lower end 36 of the compression spring 34, and therefore the piston 37 can press against the compression spring 34 from below. The piston 37 is mounted in an axially movable manner in a cylinder 38 which is connected, preferably integrally, to a lower top wall 39 of the housing lower part 19. The piston 37 is sealed in the cylinder 38, specifically by a rolling membrane 40 in the exemplary embodiment shown.

The compression spring 34 is dimensioned and configured in such a manner that, when the controller and/or electronics of the regulating device 33 fail, the liquid can flow at a maximally reduced pressure through the pressure reducer 15 in order to maintain a minimum supply of water for the animals.

The regulating device 33, in particular the compression spring 34 thereof, the piston 37 and the cylinder 38 are arranged centrally or centrically in the housing 14, and therefore the longitudinal center axes thereof lie on the longitudinal center axis 26 of the pressure reducer 15. In addition, the supporting body 22 with the supporting surface 23 and the stud 24 is located on said longitudinal center axis 26. The force of the compression spring 34 is thereby transmitted centrally to the supporting body 22 and therefore also centrally to the membrane 17 of the pressure reducer 15.

The lower end 35 of the compression spring 34 is indirectly supported on the supporting body 22 of the membrane 17 by said end of the compression spring 34 being supported on a disk 41 and/or being fastened thereto. Said disk 41 which preferably corresponds to the area of the supporting surface 23 of the supporting body 22 has, on an upper side directed toward the supporting body 22, at least three fixed feet 42 and a pin 43 serving as a movable foot. The pin 43 is mounted in the disk 41 so as to be axially displaceable parallel to the longitudinal center axis 26 of the pressure reducer 15. As a result, at least part of the force with which the disk 41 is pressed against the membrane 17 by the compression spring 34 is transmitted to the axially displaceable pin 43, or the pin 43 is subjected to said force.

A force-measuring means is fastened under the disk 41. It can be any desired force transducer. For example, it can be a strain gauge, a piezo element or a force or pressure load cell. The movable pin 43 is assigned to the force-measuring means 44 in such a manner, for example—but not necessarily—by fastening the pin 43 to the force-measuring means 44, that the force with which the compression spring 34 presses against the supporting surface 23 of the membrane 17 or vice versa can be detected by the force-measuring means 44. By means of a measured value transmission line 45, each measured value received by the force-measuring means 44 can be transmitted to electronics 46, for example a controller, arranged in the chamber 21. In the exemplary embodiment shown, the electronics 46 are fastened on the outside to the cylinder 38 of the housing 16. However, the electronics 46 can also be arranged at any other point, preferably in the housing 14 and/or within the chamber 21, but optionally also outside the housing 16.

An inlet channel 47 branches off from the inlet 27 upstream of its opening 31 which is closable as required by the regulating device 33. Said inlet channel 47 opens in the cylinder 38 of the regulating device 33, specifically on the lower side of the piston 37 lying opposite the compression spring 34. The inlet channel 47 can be formed in the housing 14, but also in a different manner, for example by a separate hose line. Liquid at the higher pressure can be fed out of the liquid supply to the lower side of the cylinder 38 through the inlet channel 47 and the piston 37 is thereby movable in the cylinder 38 in the direction of the membrane 17, which has the consequence of increasing the prestressing of the compression spring 34, as a result of which the pressure reduction rate becomes smaller, i.e. the input pressure of the liquid supply in or by the pressure reducer 15 is less severely reduced.

Furthermore, an outflow channel 48 is provided. The latter emerges from the cylinder 38 and opens in the liquid chamber 20 above the membrane 17. Liquid can flow via the outflow channel 48 out of the cylinder 38 of the regulating device 33 into the liquid chamber 20 in which liquid is located at a reduced pressure. As a result, the piston 37 can move upward in the cylinder 38 in order to relieve the load on the compression spring 34, and therefore the pressure of the liquid supply is more greatly reduced by the pressure reducer 15.

In order to be able to change the inlet of liquid through the inlet channel 47 and the outlet of the liquid through the outflow channel 48 in a targeted manner for the desired setting of the regulating device 33 by corresponding movement of the piston 37 up and down in the cylinder 38, a valve, which is preferably a solenoid valve 49, 50, is in each case arranged both in the inlet channel 47 and in the outflow channel 48. The valves in the inlet channel 47 and outflow channel 48 are preferably identical. The throughflow of liquid through the inlet channel 47 and the outflow channel 48 can be changed individually independently of each other by the solenoid valves 49, 50. The solenoid valves 49 and 50 can also be completely closed or completely opened independently of each other. The solenoid valves 49 and 50 are adjusted in a controlled manner by the electronics 46 via a control line 51 assigned to the solenoid valve 49 in the inlet channel 47 and via a control line 52 assigned to the solenoid valve 50 in the outflow channel 48. If, when the solenoid valve 50 in the outflow channel 48 is closed, the solenoid valve 49 in the inlet channel 47 is entirely or partially opened, liquid which is unreduced in pressure flows out of the liquid supply into the cylinder 38 of the regulating device 33. The piston 37 is thereby pressed down in the cylinder 38 and the compression spring 34 is more greatly prestressed, as a result of which the pressure in the liquid chamber 20 is reduced less and therefore the line drinking trough 10 can also be supplied with liquid at a pressure having a smaller pressure reduction rate. By continuously leaving at least the solenoid valve 49 in the inlet channel 47 open, the compression spring 34 is prestressed to such an extent that the regulating device 33 permits a pressure-unreduced throughflow of the liquid having a higher pressure out of the liquid supply through the liquid chamber 20 of the pressure reducer 15. The pressure reduction rate is then "1". This is desired, for example, for rinsing the at least one line drinking trough 10, in particular the drinking trough valves 12 thereof, to which the pressure reducer 15 is assigned.

So that the rinsing of the at least one line drinking trough can take place even more effectively, it is conceivable to assign an additional valve 53, which is shown in FIG. 2, to the inlet 27, specifically either in the inlet 27 or—as shown in FIG. 2—at the beginning of the inlet channel 47. By opening the valve 53, which can take place electrically, hydraulically, but also manually, liquid of high pressure also flows out of the liquid supply into the chamber 20. The liquid can thus take two routes into the liquid chamber 20, specifically through the valve 53 and through the inlet 27 which is completely opened by the regulating device 33. As a result, a sufficiently large quantity of liquid which is not reduced in pressure can be provided for effectively rinsing the line drinking trough 10 and the drinking trough valves 12 thereof.

When the respective line drinking trough 10 is being rinsed, provision can be made to completely open the solenoid valves 49 and 50 in the inlet channel 47 and in the outflow channel 48 and to keep same open so that the inlet channel 47 and the outflow channel 48 can also be rinsed. In addition, the opening 31 in the inlet 27 is permanently completely opened up here, as a result of which the high pressure from the liquid supply also flows through the liquid chamber 20.

If the pressure reduction rate which is set is intended to be maintained, the two solenoid valves 49, 50 are closed. In order to increase the pressure reduction rate, the compression spring 34 has to be relieved of load. For this purpose, only the solenoid valve 50 in the outflow channel 48 is at least partially opened, and therefore a corresponding quantity of liquid can flow out of the cylinder 38 into the liquid chamber 20, in which liquid of reduced pressure is located. As a result of the liquid escaping from the cylinder 38, the piston 37 migrates downward in the cylinder 38, and therefore the compression spring 34 is relieved of load. The membrane 17 can thereby be moved further downward. The result is that the pressure of the liquid of the liquid supply is more greatly reduced by the pressure reducer 15, i.e. a greater pressure reduction rate arises. The converse takes place when the pressure reduction rate is intended to be reduced. Then, only the solenoid valve 49 is at least partially opened, as a result of which liquid with a non-reduced higher pressure can pass via the inlet channel 47 into the cylinder 38 and can thereby push the piston 37 upward over a desired path. The compression spring 34 of the regulating device 33 is thereby prestressed more greatly, which results in a decreasing reduction in pressure and a smaller pressure reduction rate.

The method according to the invention permits adjustment of the pressure reducer 15 with the aid of the higher pressure of the liquid from the liquid supply. Said liquid pressure thus supplies the energy for adjusting the regulating device 33 of the pressure reducer 15. The pressure reducer 15 is therefore autonomous in respect of the drive required for adjusting its pressure reduction rate and/or in respect of its required energy. The drive or the energy for adjusting the pressure reducer 15 originates from the liquid supply which is attached in any case to the pressure reducer 15, namely the liquid of higher pressure originating from said liquid supply.

Since the regulating device 33 of the pressure reducer 15 operates with the liquid which is to be reduced in pressure, or is operated by said liquid, failures or malfunctions in the controller of the pressure reducer 15, in particular of the regulating device 33 of same, do not have any influence on the function of the pressure reducer 15. The pressure reducer 15 continues to operate reliably at the last setting of the regulating device 33. This can no longer be automatically adjusted until the malfunction is eliminated. However, it is conceivable to assign a manual adjustment option to the pressure reducer 15, and therefore, when the automatic controller of the pressure reducer 15 fails or malfunctions, a manual change in the pressure reduction rate is possible.

The method furthermore makes provision to adjust the pressure reducer 15 or else a plurality of pressure reducers 15 simultaneously in accordance with a time-dependent profile. This adjustment takes place in such a manner that the pressure reduction rate is changed over the time, preferably in selectable, predetermined time intervals, and in particular is adapted to the respective requirements of the animals. This can be at least a pressure reduction profile which is dependent on daytime by, for example, the liquid pressure being more greatly reduced at night, when the need of the animals for water is lower, than, for example, in the morning when the animals begin to satisfy their need for liquid and, as a result, more liquid is required. However, it is also conceivable to control the at least one pressure reducer 15 time-dependently for a longer period of time, for example over the entire fattening period of animals for fattening, by the pressure being more greatly reduced at the beginning of the fattening, when the animals are still relatively small, than at the end of the fattening, when the full-grown animals have a greater need for water. The pressure is then in practice less greatly reduced as the age of the animals increases. Finally, it is also conceivable to change the pressure reduction rate automatically depending on the shed temperature and/or the liquid temperature. At a higher temperature in the shed, the liquid pressure is less greatly reduced, and therefore more liquid is made available to the animals in the shed. The same can apply at a higher liquid temperature.

The method alternatively or additionally makes provision to individually control all or at least some selected pressure reducers 15 independently of one another in the case of sheds having a plurality of line drinking troughs 10 and a plurality of pressure reducers 15. The groups of animals assigned to the line drinking troughs 10 can thus be individually supplied with liquid by, for example, the line drinking troughs 10 for older animals being supplied with liquid which is less reduced in pressure, whereas line drinking troughs 10 for groups with younger animals are supplied with liquid which is more greatly reduced in pressure.

It is also conceivable to provide a measuring transducer, in particular a pressure sensor, for the outlet 28 of the liquid chamber 20 or in a pipe from the outlet 28 to the respective line drinking trough 10, said measuring transducer measuring, preferably continuously, the actual pressure of the liquid, which is reduced by the pressure reducer 15, for supplying the respective line drinking trough 10. The pressure measured values are then transmitted to the controller of the animal drinking trough and/or of the pressure reducer 15. Checking can thereby take place as to whether the pressure, which is reduced by the pressure reducer 15, of the liquid for supplying the respective line drinking trough 10 actually corresponds to the intended pressure. In the event of deviations, corrections can be undertaken or correction values determined which are used for future control or regulation of the pressure reduction rate of the respective pressure reducer 15.

LIST OF REFERENCE SIGNS

10 Line drinking trough
11 Liquid line
12 Drinking trough valve
13 Actuating pin
14 Housing
15 Pressure reducer
16 Housing
17 Membrane
18 Housing upper part
19 Housing lower part
20 Liquid chamber
21 Chamber
22 Supporting body
23 Supporting surface
24 Stud
25 Union nut
26 Longitudinal center axis
27 Inlet
28 Outlet
29 Axis of rotation
30 Double-armed lever
31 Opening
32 Seal
33 Regulating device
34 Compression spring
35 End (upper)
36 End (lower)
37 Piston
38 Cylinder
39 Upper top wall
40 Rolling membrane
41 Disk
42 Foot
43 Pin
44 Force-measuring means
45 Measured value transmission line
46 Electronics
47 Inlet channel
48 Outflow channel
49 Solenoid valve
50 Solenoid valve
51 Control line
52 Control line
53 Valve
54 Drip cup

What is claimed is:

1. A pressure reducer (15) for animal drinking troughs, comprising:
a housing (16) in which a membrane (17) is provided, said membrane dividing the housing (14) into
a liquid chamber (20) for liquid for supplying the animal drinking troughs, and
a chamber (21) having an adjustable regulating device (33) acting on the membrane (17); and
a regulating valve which is actuatable by the membrane (17) and is assigned to an inlet (27), opening in the liquid chamber (20), for liquid from a liquid supply,
wherein the regulating device (33) is actuatable and/or adjustable with the liquid of the liquid supply, and
wherein the regulating device (33) has at least one hydraulically prestressable spring member having an upper end (35) and a lower end (36), wherein the lower end (36) of the at least one hydraulically prestressable spring member is hydraulically prestressable by the liquid of the liquid supply, and the upper end (35) of the at least one hydraulically prestressable spring member acts on the membrane (17) by pressing against the membrane (17).

2. The pressure reducer as claimed in claim 1, further comprising an inlet channel (47) for liquid of the liquid supply to the regulating device (33) and an outflow channel (48) for liquid from the regulating device (33).

3. The pressure reducer as claimed in claim 2, wherein the inlet channel (47) and the outflow channel (48) are each assigned a valve.

4. The pressure reducer as claimed in claim 1, further comprising a force-measuring means provided between the regulating device (33) and the membrane (17).

5. The pressure reducer as claimed in claim 4, further comprising a controller into which the desired intended pressure of the liquid to be supplied to the animal drinking troughs is input, measured values detected by the force-measuring means are supplied to the controller, and the valve in the inlet channel (47) and the valve in the outflow channel (48) are controlled and/or are regulated by the controller in accordance with the predetermined intended pressure.

6. The pressure reducer as claimed in claim 1, wherein the at least one hydraulically prestressable spring member is a compression spring (34).

7. The pressure reducer as claimed in claim 6, further comprising a disk (41) assigned to the upper end (35) of the at least one hydraulically prestressable spring member that faces the membrane (17), and the at least one hydraulically prestressable spring member is supported on the membrane (17) by the disk (41).

8. The pressure reducer as claimed in claim 7, wherein the disk (41) is assigned at least one pin (43) which is movable axially freely therein and is supported at one end on or under the membrane (17) and acts at its other, opposite end on a force-measuring means.

9. The pressure reducer as claimed in claim 6, wherein the lower end (36) of the at least one hydraulically prestressable spring member that faces away from the membrane (17) is assigned a piston (37) with which a cylinder (38) which is arranged in the chamber (21) and is connected to the housing (17) corresponds, wherein the piston (37) is mounted movably in the cylinder (38).

10. The pressure reducer as claimed in claim 9, wherein the inlet channel (47) and the outflow channel (48) are connected in a liquid-conducting manner to a free piston side of the cylinder (38), wherein the valves assigned to the inlet channel (47) and to the outflow channel (48) are arranged upstream of the cylinder (38) in the inlet channel (47) and downstream of the cylinder (38) in the outflow channel (48), as seen in the direction of flow of the liquid through the inlet channel (47) and the outflow channel (48).

11. The pressure reducer as claimed in claim 9, wherein the outflow channel (48) emerging from the cylinder (38) ends and/or opens in the liquid chamber (20).

12. The pressure reducer as claimed in claim 10, wherein the outflow channel (48) emerging from the cylinder (38) ends and/or opens in the liquid chamber (20).

13. The pressure reducer as claimed in claim 3, wherein the valve is an electrically controllable solenoid valve (49, 50).

14. The pressure reducer as claimed in claim 7, wherein the means for measuring a force or a mechanical pressure is connected to the disk (41).

15. The pressure reducer as claimed in claim 7, wherein the at least one pin is connected to the force-measuring means.

\* \* \* \* \*